US010922622B2

(12) United States Patent
Chakra et al.

(10) Patent No.: US 10,922,622 B2
(45) Date of Patent: *Feb. 16, 2021

(54) DYNAMIC MESSAGE CATEGORIZATION FOR OPTIMIZED MESSAGE TARGETING

(71) Applicant: International Business Machines Corporation, Armonk, NY (US)

(72) Inventors: Al Chakra, Apex, NC (US); Liam Harpur, Dublin (IE); Sumit Patel, Irving, TX (US); Enda Sexton, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 971 days.

This patent is subject to a terminal disclaimer.

(21) Appl. No.: 15/378,578

(22) Filed: Dec. 14, 2016

(65) Prior Publication Data

US 2018/0165600 A1 Jun. 14, 2018

(51) Int. Cl.
*G06N 20/00* (2019.01)
*G06F 16/38* (2019.01)
(Continued)

(52) U.S. Cl.
CPC .......... *G06N 20/00* (2019.01); *G06F 16/353* (2019.01); *G06F 16/38* (2019.01); *G06F 40/20* (2020.01);
(Continued)

(58) Field of Classification Search
CPC ..... H04L 51/32; H04L 51/14; G06Q 30/0241; G06N 20/00; G06N 5/02; G06N 5/022;
(Continued)

(56) References Cited

U.S. PATENT DOCUMENTS 7,201,311 B2 4/2007 Liberti et al.
8,909,569 B2 12/2014 Spivack et al.
(Continued)

FOREIGN PATENT DOCUMENTS

WO 2014070689 A1 5/2014

OTHER PUBLICATIONS

Buckley et al., "Social media and customer behavior analytics for personalized customer engagements", IBM J. Res. & Dev. vol. 58 No. 5/6 Paper 7 Sep./Nov. 2014. (Year: 2014).*
(Continued)

*Primary Examiner* — Dave Misir
(74) *Attorney, Agent, or Firm* — Cantor Colburn LLP; Teddi Maranzano

(57) ABSTRACT

An automated dynamic message categorization system is provided and includes first, second and third processing units. The first processing unit is configured to generate a user interface (UI) and to present the UI to a user. The second processing unit is configured to pull information from a first textual element which has been entered into the UI, to identify second textual elements that are relevant to the first textual element based on the pulled information and to extract textual element identifiers from the second textual elements. The third processing unit is configured to generate, for each extracted textual element identifier, a confidence score describing a degree of correlation between each extracted textual element identifier and the first textual element. The first processing unit is further configured to present to the user each extracted textual element identifier with a corresponding confidence score as a selectable option via the UI.

11 Claims, 4 Drawing Sheets

(51) Int. Cl.
   *G06F 16/35* (2019.01)
   *H04L 12/58* (2006.01)
   *G06Q 30/02* (2012.01)
   *G06F 40/20* (2020.01)
(52) U.S. Cl.
   CPC ......... *G06Q 30/0241* (2013.01); *H04L 51/14* (2013.01); *H04L 51/32* (2013.01)
(58) Field of Classification Search
   CPC ...... G06N 5/025; G06N 5/048; G06N 99/005; G06N 7/005; G06F 16/38; G06F 16/353; G06F 17/27; G06F 17/30707; G06F 17/30722
   USPC .......................................................... 706/11
   See application file for complete search history.

(56) References Cited

U.S. PATENT DOCUMENTS

| | | | |
|---|---|---|---|
| 9,009,162 B1 | 4/2015 | Luo | |
| 9,965,462 B2 | 5/2018 | Werth et al. | |
| 2012/0095862 A1* | 4/2012 | Schiff | G06Q 30/06 705/26.7 |
| 2012/0265806 A1 | 10/2012 | Blanchflower et al. | |
| 2014/0040387 A1* | 2/2014 | Spivack | G06F 16/24578 709/206 |
| 2014/0114978 A1 | 4/2014 | Chatterjee et al. | |
| 2014/0258198 A1 | 9/2014 | Spivack et al. | |
| 2015/0120788 A1* | 4/2015 | Brun | G06F 16/22 707/812 |
| 2015/0149153 A1* | 5/2015 | Werth | G06F 17/2785 704/9 |
| 2015/0149539 A1 | 5/2015 | Shukla et al. | |
| 2015/0178371 A1* | 6/2015 | Seth | G06F 16/3322 707/748 |
| 2015/0372963 A1 | 12/2015 | Root et al. | |
| 2016/0162582 A1* | 6/2016 | Chatterjee | G06F 16/9535 707/706 |
| 2016/0188567 A1* | 6/2016 | Pasternack | G06N 7/005 704/9 |
| 2016/0189040 A1* | 6/2016 | Vickrey | G06N 5/04 706/12 |
| 2016/0189246 A1 | 6/2016 | Eldh et al. | |
| 2016/0217500 A1 | 7/2016 | Brigham | |
| 2016/0328401 A1* | 11/2016 | Dhawan | G06F 16/9535 |
| 2017/0011029 A1* | 1/2017 | Chatterjee | G06Q 50/01 |

OTHER PUBLICATIONS

Alam et al., "Adding Emotional Tag to Augment Context-Awareness in Social Network Services", IEEE, 2011. (Year: 2011).*

Bellaachia et al., "Learning from Twitter Hashtags: Leveraging Proximate Tags to Enhance Graph-based Keyphrase Extraction", 2012 IEEE International Conference on Green Computing and Communications, Conference on Internet of Things, and Conference on Cyber, Physical and Social Computing. (Year: 2012).*

Harvey, Morgan and Crestani, Fabio (2015) "Long time, no tweets! Time-aware personalised hashtag suggestion". In: ECIR 2015—37th European Conference on IR Research, Mar. 29-Apr. 1, 2015, Vienna, Austria. (Year: 2015).*

Otsuka et al., "Design and Evaluation of a Twitter Hashtag Recommendation System", IDEAS'14 Jul. 7-9, 2014, Porto, Portugal. (Year: 2014).*

Lu et al., "A Twitter Hashtag Recommendation Model that Accommodates for Temporal Clustering Effects", IEEE Intelligent Systems, 2015. (Year: 2015).*

Mohammad et al., "Sentiment, emotion, purpose, and style in electoral tweets", Information Processing and Management 51 (2015) 480-499. (Year: 2015).*

Nelaturu et al., "Hashtag Recommendation System in a P2P Social Networking Application", David C. Wyld et al. (Eds) : Acity, DPPR, VLSI, WiMNET, AIAA, CNDC—2015 pp. 81-93, 2015. (Year: 2015).*

List of IBM Patents or Patent Applications Treated as Related; (Appendix P), Filed Feb. 13, 2017; 2 pages.

Al Chakra et al., "Dynamic Message Categorization for Optimized Message Targeting", U.S. Appl. No. 15/431,326, filed Feb. 13, 2017.

Mazzia et al, "Suggesting Hashtags on Twitter," http://alliemazzia.com/pubs/545-final.pdf. 2013. 8 Pages.

Zangerle et al, "Recommending #-Tags in Twitter," http://ceur-ws.org/Vol-730/paper7.pdf. 2011. 12 pages.

IBM Watson "Operationalize AI with Watson", retrieved at: https://www.ibm.com/watson; downloaded Sep. 2, 2020; 4 pgs.

\* cited by examiner

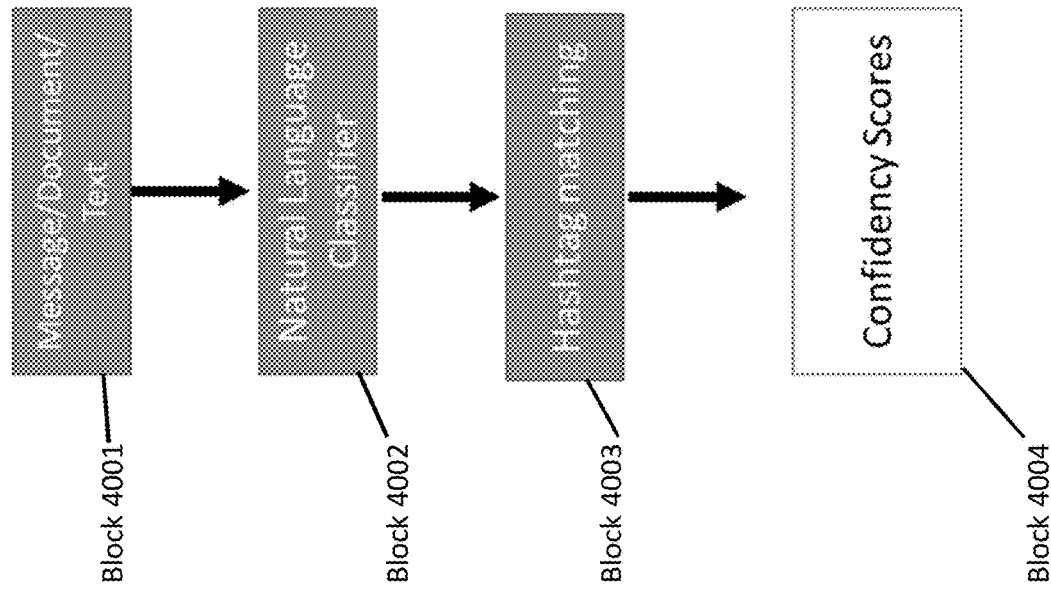
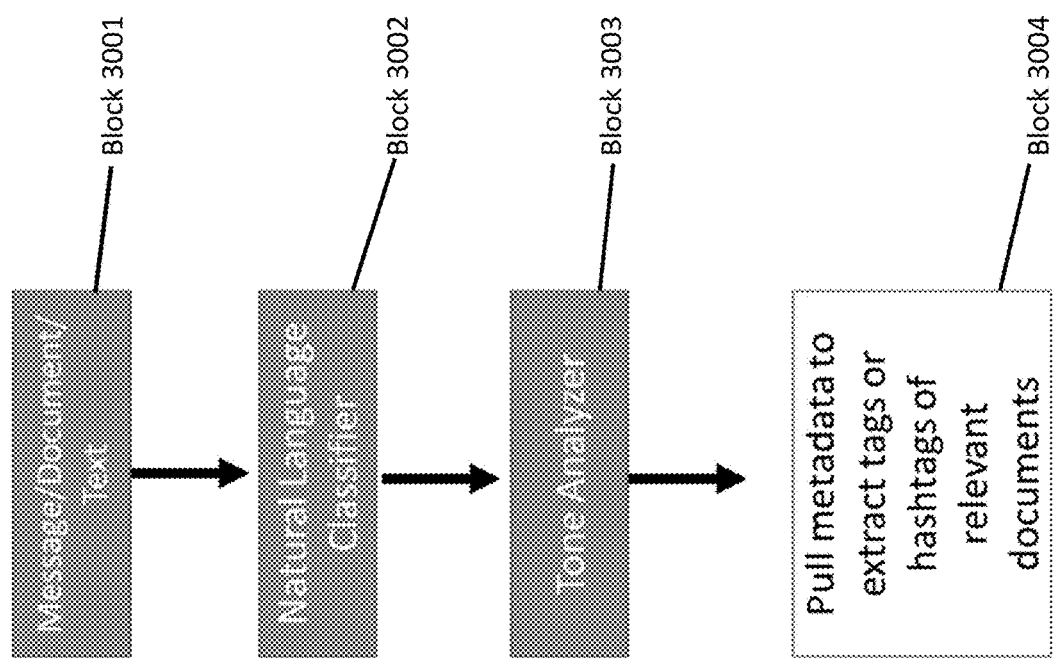

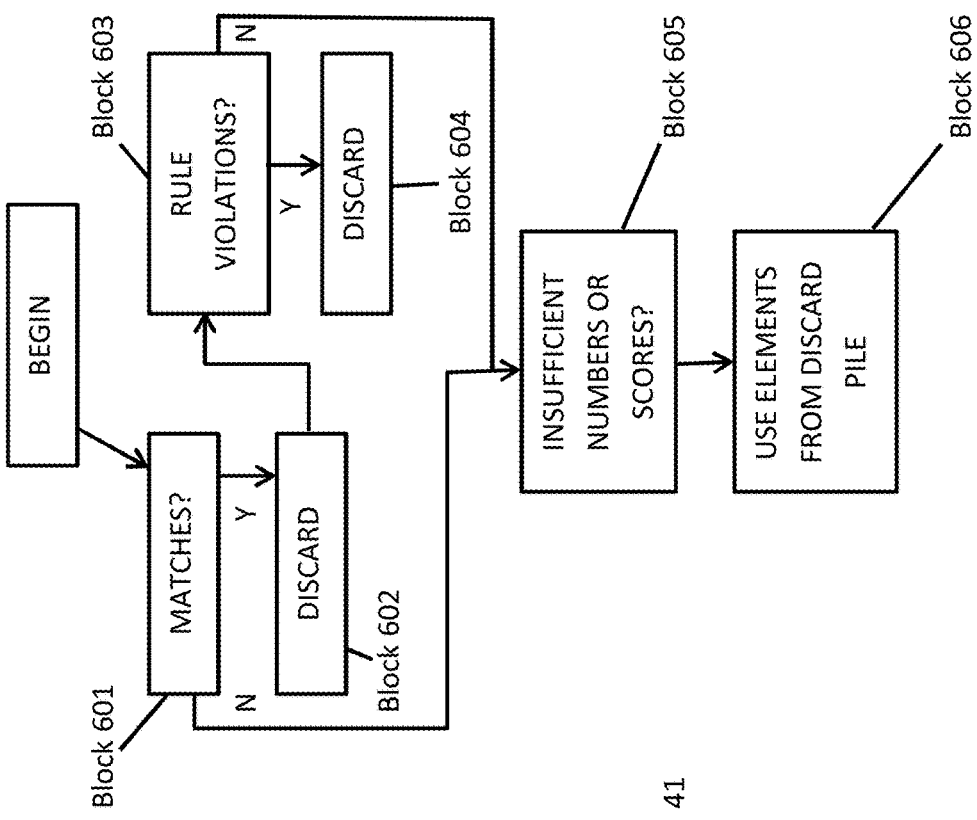

DYNAMIC MESSAGE CATEGORIZATION FOR OPTIMIZED MESSAGE TARGETING

BACKGROUND

The present invention relates to message categorization and, more specifically, to a dynamic message categorization for optimized message targeting.

With current advertising having a strong focus on deployment in social media platforms, such as Twitter™, it is important that language used to convey an advertising message is appropriate to the relevant context. This is especially true for those advertising programs where a correct audience is being targeted. In the case of Twitter™, since more than 500 million tweets are sent out per day, tweets or messages with ineffective context are unlikely to be seen. Additionally, companies may attempt to create context through various promotions only to have their messages be misinterpreted, such as when certain companies develop hashtags where they encourage users to share memories related to those companies but the hashtags unfortunately take on a life of their own whereby users on Twitter™ end using the hashtags to publically trash the companies. Cases like these are notable in the context of Twitter™ in particular due to the role hashtags play in shaping dialogues, drawing attention to the messages they are being associated with and framing discussion context but the underlying problem applies to many other platforms where message categorization is required.

In view of the issues noted above and given the evolving lexicon on Twitter™ and other similar platforms, it is becoming evident that having a grasp of shifting and dynamically changing terms can be vital as they evolve and grow or decrease in importance. This is especially required by advertisers who are intent on using various terms that resonate culturally with an audience and are consistent with an overall messaging strategy.

So, while using correct terminology in a given advertisement, message or tweet is important for creating the desired impact, usage of a correct hashtag or set of hashtags (in the Twitter™ universe, for example) can allow for a more accurate tweet in regard to who sees it. Typical solutions to this issue tend to focus on message optimization efforts but gaps still exist for optimizing the message for certain audiences at post-creation staging.

SUMMARY

According to an embodiment of the present invention, an automated dynamic message categorization system is provided and includes first, second and third processing units. The first processing unit is configured to generate a user interface (UI) and to present the UI to a user. The second processing unit is configured to pull information from a first textual element which has been entered into the UI, to identify second textual elements that are relevant to the first textual element based on the pulled information and to extract textual element identifiers from the second textual elements. The third processing unit is configured to generate for each extracted textual element identifier a confidence score describing a degree of correlation between each extracted textual element identifier and the first textual element. The first processing unit is further configured to present to the user each extracted textual element identifier with a corresponding confidence score as a selectable option via the UI.

According to another embodiment of the present invention, a method of automated dynamic message categorization is provided and includes presenting a user interface (UI) to a user, pulling information from a first textual element which has been entered into the UI, identifying second textual elements that are relevant to the first textual element based on the pulled information and extracting textual element identifiers from the second textual elements. The method further includes generating for each extracted textual element identifier a confidence score describing a degree of correlation between each extracted textual element identifier and the first textual element and presenting to the user each extracted textual element identifier with a corresponding confidence score as a selectable option via the UI.

According to yet another embodiment of the present invention, a computer program product for automated dynamic message categorization is provided. The computer program product includes a processor and a storage element. The storage element has executable instructions stored thereon, which, when executed, cause the processor to execute a method. The method includes presenting a user interface (UI) to a user, pulling information from a first textual element which has been entered into the UI, identifying second textual elements that are relevant to the first textual element based on the pulled information and extracting textual element identifiers from the second textual elements. The method further includes generating for each extracted textual element identifier a confidence score describing a degree of correlation between each extracted textual element identifier and the first textual element and presenting to the user each extracted textual element identifier with a corresponding confidence score as a selectable option via the UI.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 3 is a flow diagram illustrating a process of message categorization in accordance with embodiments;

FIG. 4 is a flow diagram illustrating a process of scoring text element identifiers in accordance with embodiments;

FIG. 5 is an illustration of an exemplary user interface in accordance with embodiments;

FIG. 6 is a flow diagram illustrating an additional process of discarding an un-discarding text element identifiers in accordance with embodiments.

DETAILED DESCRIPTION

Figure 2:
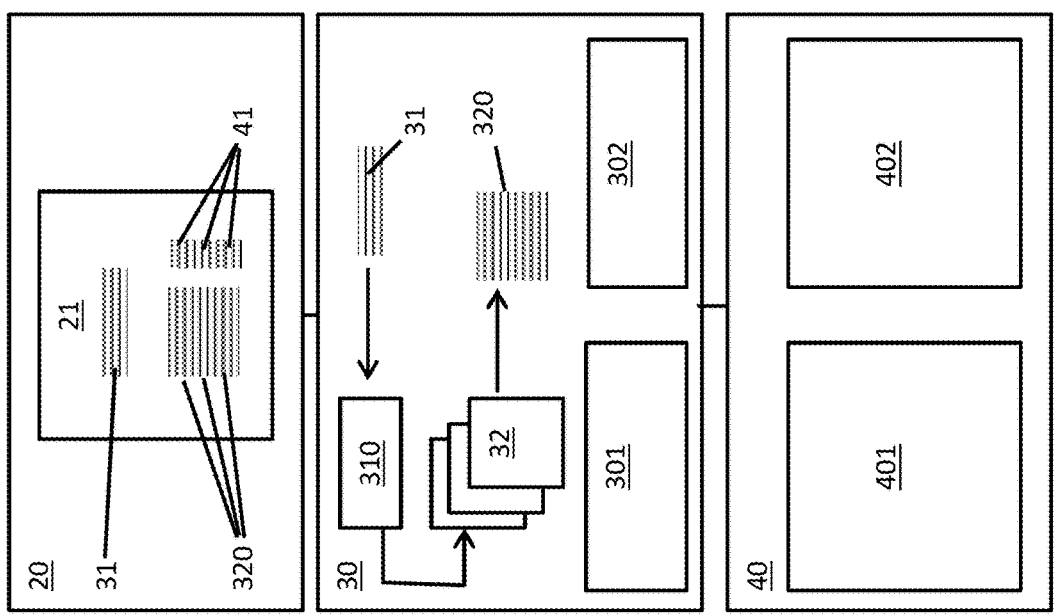
FIG. 2 is a schematic diagram of a computer program product run or executed on the computing system of FIG. 2 for automated dynamic message categorization in accordance with embodiments.

As will be described below, an automated dynamic message categorization system is provided. The automated dynamic message categorization system helps users select a most appropriate hashtag for a given message or tweet. In greater detail, the automated dynamic message categorization system allows an end user to see a correct hashtag for a given message or tweet and, in so doing, compiles a database of hashtags and terms most commonly used with them and provides a way that a message can be entered, parsed for selection of key terms and made subject to predictive analysis for hashtag-message matching. The automated dynamic message categorization system also provides for different treatment of long and short tweets using characteristics beyond those of the initial message to improve matching accuracy.

When an advertiser or a normal user using a social media platform, such as Twitter™ wishes to post a tweet, an initial draft of the tweet is often shaped and adjusted to improve its impact or reach with the aim of increasing a maximum possible readership.

Currently, a majority of advertising on Twitter™ is done via sponsored tweets and this incurs a cost on the advertiser. The following description proposes and outlines a system by which this cost could be avoided or reduced while allowing a version of a targeted tweet to be generated and disseminated. This system is different from one which is concerned with message optimization as defined above, however, in that message optimization focuses on the creation of messages that will likely resonate with a large an audience as possible whereas here the focus is on the optimization of a categorization of the message. In other words, in a typical use case, a user interface is provided that allows a Twitter™ user to enter a message and be returned a list of hashtags along with the probable likelihood of their association with the message. The user then selects one of the hashtags and the message is posted with the accompanying selected hashtag. Now, the message is part of the contextually correct hashtag stream on Twitter™ and is viewable to all those following that stream so that the message (or tweet) is provided to its most correct or appropriate audience.

As a further example, consider that a user may be able to use existing systems to develop a message which will likely appeal to their target audience of outdoor orientated millennials (e.g., "Grab your phones and hit the mountains this weekend, the best Instagram™ photo will win a gift card"). This message or one like it may be tagged with the hashtag of the company offering the gift card and perhaps a contest hashtag but further analysis of whether those hashtags are and continue to be appropriate is typically not conducted. Moreover, trending topics which may or may not be relevant to hiking the mountains and other trending hashtags may exist and it is likely that the user would (and should) leverage those topics and hashtags if they were known. Here, while traditional tools would not provide for a correlation between those other trending topics or hashtags with the mountain photography contest, a categorization optimization system as described herein will provide this additional feature.

Thus, the categorization optimization system described herein will ultimately provide for a smart way to share content on Twitter™ or other similar social media platforms by allowing for an increase in accuracy when crafting a or a message to resonate with and be viewable by a correct target audience.

Figure 1:
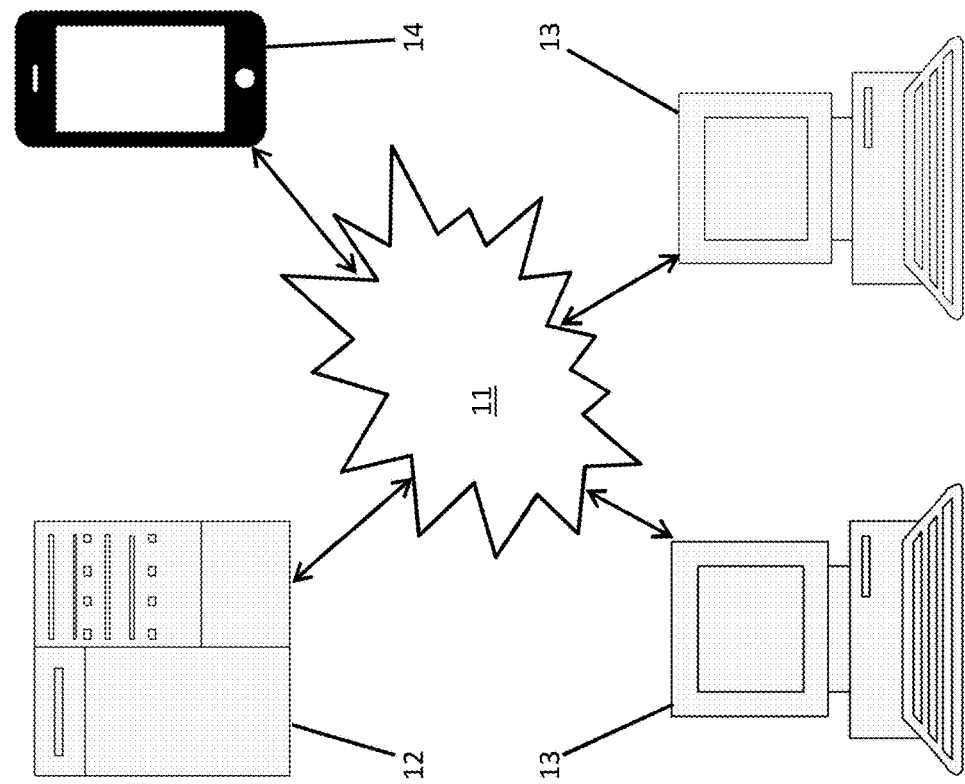
FIG. 1 is a schematic diagram of a computing system in accordance with embodiments.

With reference now to FIGS. 1 and 2, an automated dynamic message categorization system 10 is provided. The automated dynamic message categorization system 10 can be provided as a computing system that is deployed over a network 11 by which a plurality of servers 12, client computers 13 and portable devices 14 (e.g., smart phones and tablets) are communicative with one another. As shown in FIG. 2, any one or more of the servers 12 and the client computers 13 can be configured such that they provide a first processing unit 20, a second processing unit 30 and a third processing unit 40. The first processing unit 20 is configured to generate a user interface (UI) 21 and to present the UI 21 to a user by way of a display unit. The second processing unit 30 is configured to pull information 310 from a first textual element 31 which has been entered into the UI 21, to identify second textual elements 32 that are relevant to the first textual element 31 based on the pulled information 310 and to extract textual element identifiers 320 from the second textual elements 32. The third processing unit 40 is configured to generate, for each extracted textual element identifier 320, a confidence score 41 describing a degree of correlation between each extracted textual element identifier 320 and the first textual element 31. The first processing unit 20 is further configured to present to the user each extracted textual element 320 with a corresponding confidence score 41 as a selectable option via the UI 21. The degree of correlation can be based on emotive, social tendency and language style overlaps between each extracted textual element identifier 320 and the first textual element 31.

In accordance with embodiments, the first textual element 31 can be considered a tweet or another similar text element, such as a text message. For purposes of clarity and brevity, however, it will be assumed that the first textual element 31 is a tweet and is generated by the user for use within the context of the Twitter™ platform. Thus, the second textual elements 32 can include any publicly available tweets, messages and documents that are accessible to the second processing unit 30 and the extracted textual element identifiers 320 can include, for example, tags or hashtags.

As shown in FIG. 2, the second processing unit 30 can include a natural language classifier element 301 and a tone analyzer element 302. In addition, the second processing unit 30 can also include a first database and a second database both of which will be described below.

The natural language classifier element 301 generally operates by interpreting a user's intent behind a given text and returning a corresponding classification of that text based on the results of that interpretation (with, in some cases, associated confidence levels). Thus, in this case, the natural language classifier element 301 serves to determine a classification or buckets of the first textual element 31 (or tweet) as a whole. As such, if the first textual element 31 states "grab your phone and hit the mountains this weekend, best Instagram photo will win a gift card," the natural language classifier element 301 can classify the first textual element 31 as being related to the outdoors and hiking from the combination of the "hit" and "mountains" terms and as being related to millennials from the "grab", "phone" and "Instagram" terms.

The tone analyzer element 302 generally operates by using linguistic analysis to detect three types of tones from text: emotion, social tendencies, and language style. Emotions that are identified can include things like anger, fear, joy, sadness and disgust. Identified social tendencies can include things from the "Big Five" personality traits used by some psychologists: openness, conscientiousness, extroversion, agreeableness and emotional range. Identified language styles can include confident, analytical and tentative styles. Thus, in the present case, the tone analyzer element 302 serves to determine a user's emotions, social tendencies and language styles from the first textual element 31 (or tweet). As such, if the first textual element 31 once again states "grab your phone and hit the mountains this weekend, best Instagram photo will win a gift card," the tone analyzer element 302 can determine that the user writing the first textual element 31 is exhibiting a combination of fear and joy, is somewhat open, extroverted and agreeable and is somewhat confident from the overall tone of the language.

Respective outputs of the natural language classified element 301 and the tone analyzer element 302 along with various other items of data (e.g., timestamps, user identification, user historical data, etc.) can be aggregated as metadata. This metadata, in combination with representative portions of the actual text of the first textual element 31, forms the bulk of the pulled information 310. The pulled information 310 is thus deposited into the first database along with additional text data from which the second textual elements 32 and the extracted textual element identifiers 320 can be drawn. This additional text data can be dynamically loaded into and purged from the first database based on various characteristics of the pulled information 310 so as to increase the likelihood of finding the second textual elements 32. Thus, in the exemplary cases provided above, the additional text data will relate generally to the outdoors and hiking, millennials, exhibits fearfulness and joyfulness, exhibits openness and extroverted and agreeable qualities and exhibits confidence in its overall tone.

Once the pulled information 310 is deposited into the first database along with the additional text data, an output portion of the first database can be populated with the second textual elements 32 and the extracted textual element identifiers 320. In accordance with embodiments, the extracted textual element identifiers 320 can be appended with a trend history or other similar information.

Given the configuration of the second processing unit 30 as described above, operations of the second processing unit 30 will now be described with reference to FIG. 3. As shown in FIG. 3, the second processing unit 30 is essentially responsible for executing a process by which perspectives are determined from the first textual element 31. That is, the second processing unit 30 initially receives the first textual element 31 as an input (block 3001). Then, the natural language classifier element 301 and the tone analyzer element 302 are engaged (sequentially or otherwise) to determine classifications or "buckets" of the first textual element 31 and to conduct an advanced sentiment analysis of the textual element (blocks 3002 and 3003). Finally, the pulled information 310 is aggregated and deposited into the first database whereupon the output portion of the first database is populated with the second textual elements 32 and at least the extracted textual element identifiers 320 (block 3004).

As shown in FIG. 2, the third processing unit 40 can include a natural language classifier element 401 and a matching element 402. The natural language classifier element 401 generally operates in a similar manner as the natural language classifier element 301. Thus, in this case, the natural language classifier element 401 serves to determine which second textual elements 32 populating the output portion of the first database 303 fit within the classifications or buckets of the first textual elements 31. The matching element 402 determines a number or count by which a given one of the second textual elements 32 fits within the classifications or buckets of the first textual elements 31 and derives the confidence score 41 from this number or count.

Given the configuration of the third processing unit 40 as described above, operations of the third processing unit 40 will now be described with reference to FIG. 4. As shown in FIG. 4, the third processing unit 40 is essentially responsible for executing a process by which the second textual elements 32 are matched to perspectives. That is, the third processing unit 40 initially receives the second textual elements 32 as an input (block 4001). Then, the natural language classifier element 401 and the matching element 402 are engaged (sequentially or otherwise) to determine which second textual elements 32 populating the output portion of the first database fit within the classifications or buckets of the first textual elements 31 and to derive the confidence score (blocks 4002 and 4003). Finally, the extracted textual element identifiers 320 of the most highly scored second textual elements 32 are displayed by and along with their respective confidence scores 41 (block 4004) by the first processing unit 20.

With reference to FIG. 5, an exemplary UI 21 is provided. As shown in FIG. 5, the UI 21 may include an input field 210 and an output field 211. The first textual element 31 can be entered into the input field 210 whereby a secondary input, such as a pressing of a "return" button on a corresponding keyboard or clicking on a "DONE" link in the UI 21, initiates operations of the second and third processing units 30 and 40. The output field 211 includes a configurable listing of the extracted textual element identifiers 320 and their corresponding confidence scores 41. In accordance with embodiments, the extracted textual element identifiers 320 can be presented as links that, when clicked, cause an automatic insertion of the corresponding extracted textual element identifier 320 into the first textual element 31.

In accordance with further embodiments and, with reference back to FIG. 2 and with additional reference to FIG. 6, the second processing unit 30 can be further configured to maintain the second database. This second database would be populated by an updateable and modifiable listing of generic tags and hashtags. As such, the second processing unit 30 can match any one or more of the generic tags and hashtags from the second database with the extracted textual element identifiers 320 of the first database and discard any one or more of the matching ones of the extracted textual element identifiers 320.

As shown in FIG. 6, this further operation of the second processing unit 30 will now be described. At an initial time, the second processing unit 30 compares the extracted textual element identifiers 320 of the first database with the generic tags and hashtags of the second database (block 601) and matches are transferred into a potential discard pile (block 602). The second processing unit 30 might also refer to social media platform rules (block 603) and transfer extracted textual element identifiers 320 into the potential discard pile (block 604) based on likely violations of those rules (e.g., if a hashtag would make a given tweet greater than 142 characters, it would be barred for Twitter™). Subsequently, if a number of the non-generic and compliant extracted textual element identifiers 320 is determined to be insufficient or if those extracted textual element identifiers 320 that remain are determined to have excessively low confidence scores 41 that do not meet a lowest threshold (block 605), the highest scoring extracted textual element identifiers 320 can be removed from the potential discard pile and inserted into the UI 21.

While it is understood that the processes described above and corresponding software may be deployed by manually loading it directly in client, server and proxy computers via loading into a storage medium such as a CD, DVD, etc., the processes and software (hereinafter referred to as "process software") may also be automatically or semi-automatically deployed into a computer system by way of a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code and then install the proxy server code on the proxy computer. The process software will be transmitted to the proxy server, and then it will be stored on the proxy server.

Figure 7:
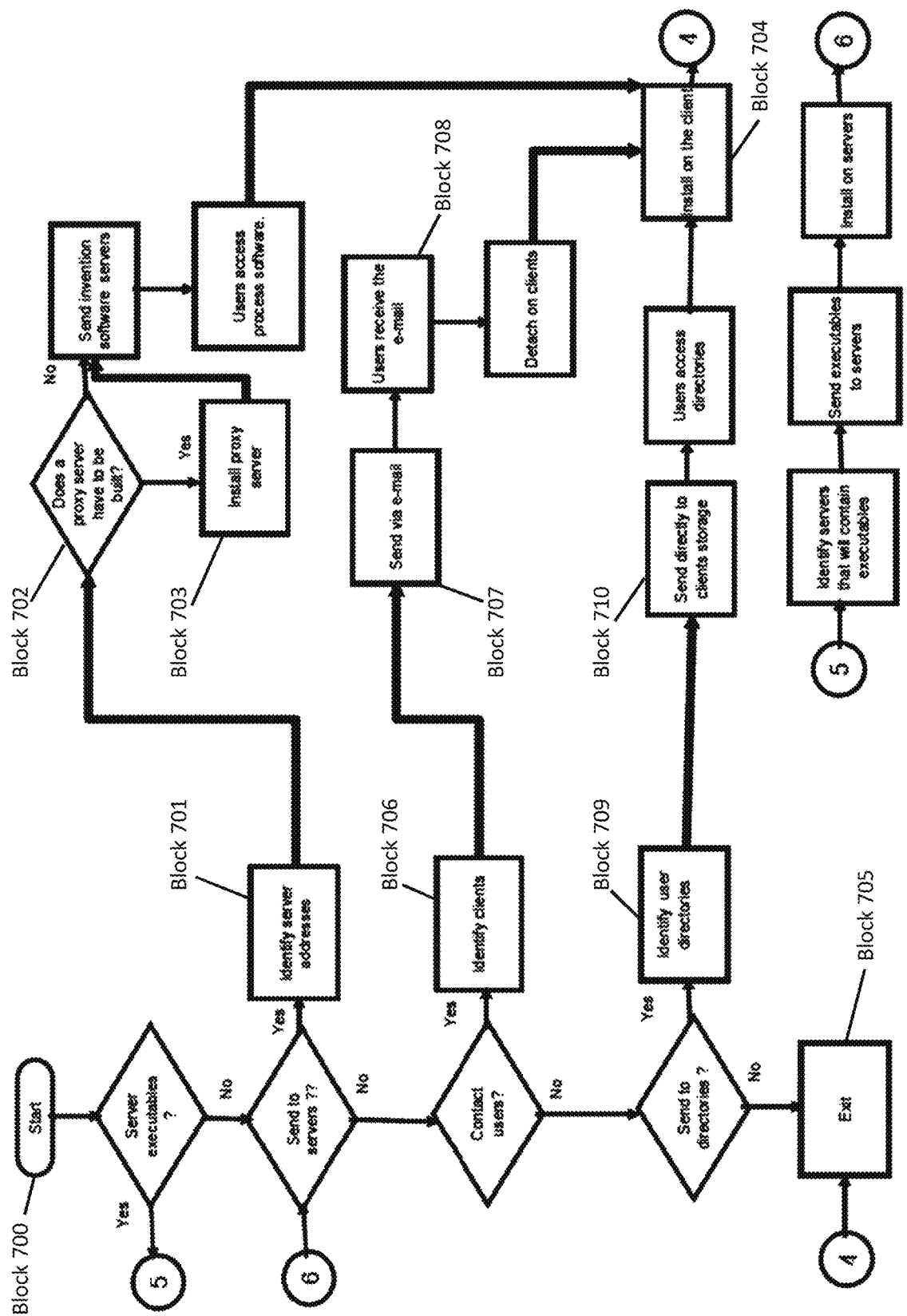
FIG. 7 is a flow diagram illustrating a method of deployment of the computer program product of FIG. 2.

That is, with reference to FIG. 7, block 700 begins the deployment of the process software. An initial action is to determine if there are any programs that will reside on a server or servers when the process software is executed. If this is the case, then the servers that will contain the executables are identified (block 701). The process software for the server or servers is transferred directly to the servers' storage via FTP or some other protocol or by copying though a shared file system. The process software is then installed on the servers.

Next, a determination is made on whether the process software is to be deployed by having users access the process software on a server or servers. If the users are to access the process software on servers, then the server addresses that will store the process software are identified.

A determination is made if a proxy server is to be built (block 702) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 703). The process software is sent to the (one or more) servers either via a protocol such as FTP, or it is copied directly from the source files to the server files via file sharing. Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems. Another embodiment is to have the servers automatically copy the process software to each client and then run the installation program for the process software at each client computer. The user executes the program that installs the process software on his client computer (block 704) and then exits the process (block 705).

A determination is made whether the process software is to be deployed by sending the process software to users via e-mail. The set of users where the process software will be deployed are identified together with the addresses of the user client computers (block 706). The process software is sent via e-mail to each of the users' client computers. The users then receive the e-mail (block 707) and detach the process software from the e-mail to a directory on their client computers (block 708). The user executes the program that installs the process software on his client computer (block 704) and then exits the process (block 705).

Lastly, a determination is made on whether the process software will be sent directly to user directories on their client computers. If so, the user directories are identified (block 709). The process software is transferred directly to the user's client computer directory (block 710). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software. The user executes the program that installs the process software on his client computer (block 704) and then exits the process (block 705).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An automated dynamic message categorization system, comprising:
    a first processing unit configured to generate a user interface (UI) and to present the UI to a user;
    a second processing unit comprising a natural language classifier and a tone analyzer, the second processing unit being configured to pull information from a first textual element which has been entered into the UI and to identify second textual elements that are relevant to the first textual element based on the pulled information, and being further configured to extract textual element identifiers from the second textual elements by:
    interpreting user intent behind text of the first textual element and returning a corresponding classification of that text based on the results of that interpretation by the natural language classifier; and
    using linguistic analysis to detect emotion, social tendencies and language style from the text, the emotions being anger, fear, joy, sadness and disgust, the social tendencies being openness, conscientiousness, extroversion, agreeableness and emotional range and the language styles being confident, analytical and tentative by the tone analyzer; and
    a third processing unit configured to generate for each extracted textual element identifier a confidence score describing a degree of correlation between each extracted textual element identifier and the first textual element, wherein the degree of correlation is based on emotive, social tendency and language style overlaps between each extracted textual element identifier and the first textual element,
    the first processing unit being further configured to present to the user each extracted textual element identifier with a corresponding confidence score as a selectable option via the UI, wherein:
    respective outputs of the natural language classifier and the tone analyzer are aggregated with timestamps, user identification and historical data as metadata,
    the pulled information comprises the metadata and representative portions of the text of the first textual element, and
    the second processing unit further comprises first and second databases, wherein:
    the pulled information is dynamically loaded into and purged from the first database based on characteristics of the pulled information to increase a likelihood of the second textual elements being found,
    an output portion of the first database is populated with the second textual elements and at least the extracted textual element identifiers, and
    the second database is populated by an updateable and modifiable listing of generic tags and hashtags.

2. The automated dynamic message categorization system according to claim 1, wherein the second processing unit comprises a natural language classifier and a tone analyzer.

3. The automated dynamic message categorization system according to claim 1, wherein the first textual element comprises a tweet.

4. The automated dynamic message categorization system according to claim 3, wherein each extracted textual element identifier comprises a tag or a hashtag.

5. The automated dynamic message categorization system according to claim 3, wherein the second processing unit is further configured to maintain a database of generic tags and hashtags and to discard an extracted textual element identifier comprising any one or more of the generic tags or hashtags included in the database.

6. The automated dynamic message categorization system according to claim 1, wherein the degree of correlation is based on emotive, social tendency and language style overlaps between each extracted textual element identifier and the first textual element.

7. A computer program product for automated dynamic message categorization, the computer program product comprising:
  a processor comprising first, second and third processing units, the second processing unit comprising a natural language classifier and a tone analyzer; and
  a storage element having executable instructions stored thereon, which, when executed, cause the processor to execute a method comprising:
    presenting a user interface (UI) to a user by the first processing unit;
    pulling information from a first textual element which has been entered into the UI by the second processing unit;
    identifying second textual elements that are relevant to the first textual element based on the pulled information by the second processing unit, wherein the extracting comprises:
      interpreting user intent behind text of the first textual element and returning a corresponding classification of that text based on the results of that interpretation by the natural language classifier; and
      using linguistic analysis to detect emotion, social tendencies and language style from the text, the emotions being anger, fear, joy, sadness and disgust, the social tendencies being openness, conscientiousness, extroversion, agreeableness and emotional range and the language styles being confident, analytical and tentative by the tone analyzer;
    extracting textual element identifiers from the second textual elements by the second processing unit;
    generating for each extracted textual element identifier a confidence score describing a degree of correlation between each extracted textual element identifier and the first textual element by the third processing unit, wherein the degree of correlation is based on emotive, social tendency and language style overlaps between each extracted textual element identifier and the first textual element; and
    presenting to the user each extracted textual element identifier with a corresponding confidence score as a selectable option via the UI by the first processing unit,
  wherein:
    respective outputs of the natural language classifier and the tone analyzer are aggregated with timestamps, user identification and historical data as metadata,
    the pulled information comprises the metadata and representative portions of the text of the first textual element,
    the second processing unit comprises first and second databases, wherein:
      the pulled information is dynamically loaded into and purged from the first database based on characteristics of the pulled information to increase a likelihood of the second textual elements being found,
      an output portion of the first database is populated with the second textual elements and at least the extracted textual element identifiers, and
      the second database is populated by an updateable and modifiable listing of generic tags and hashtags, and
    the first textual element comprises a tweet.

8. The computer program product according to claim 7, wherein the pulling of information comprises natural language classification and tone analysis of the first textual element.

9. The computer program product according to claim 7, wherein each extracted textual element identifier comprises a tag or a hashtag.

10. The computer program product according to claim 7, further comprising:
  maintaining a database of generic tags and hashtags; and
  discarding an extracted textual element identifier comprising any one or more of the generic tags or hashtags included in the database.

11. The computer program product according to claim 7, further comprising:
  identifying emotive, social tendency and language style overlaps between each extracted textual element identifier and the first textual element; and
  basing the degree of correlation on the identified emotive, social tendency and language style overlaps.

\* \* \* \* \*